US009759104B2

(12) United States Patent
Jessberger et al.

(10) Patent No.: US 9,759,104 B2
(45) Date of Patent: Sep. 12, 2017

(54) CRANKCASE VENTILATION DEVICE

(71) Applicant: MANN+HUMMEL GMBH, Ludwigsburg (DE)

(72) Inventors: Thomas Jessberger, Asperg (DE); Michael Daiber, Ludwigsburg (DE); Dirk Traichel, Bietigheim-Bissingen (DE); Holger Beyerlin, Rutesheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 77 days.

(21) Appl. No.: 14/730,314

(22) Filed: Jun. 4, 2015

(65) Prior Publication Data
US 2015/0275718 A1     Oct. 1, 2015

Related U.S. Application Data

(63) Continuation-in-part of application No. 13/607,694, filed on Sep. 8, 2012, now abandoned.

(30) Foreign Application Priority Data

Sep. 8, 2011 (DE) ........................ 10 2011 112 584

(51) Int. Cl.
| F01M 13/00 | (2006.01) |
| G01M 15/04 | (2006.01) |
| F02M 25/06 | (2016.01) |

(52) U.S. Cl.
CPC ........ F01M 13/0011 (2013.01); F02M 25/06 (2013.01); G01M 15/042 (2013.01); *F01M 2013/0016* (2013.01); *Y02T 10/121* (2013.01)

(58) Field of Classification Search
CPC ........ F01M 13/011; F01M 2013/0016; F02M 25/06; G01M 15/042; Y02T 10/121
USPC ....................... 123/572–574, 41.86
See application file for complete search history.

(56) References Cited

U.S. PATENT DOCUMENTS

| 4,856,487 | A | * | 8/1989 | Furuya | F01M 13/023 |
| | | | | | 123/574 |
| 5,335,641 | A | * | 8/1994 | Schnabel | F01M 11/04 |
| | | | | | 123/572 |
| 6,256,986 | B1 | * | 7/2001 | Langen | F15B 11/003 |
| | | | | | 60/462 |
| 8,151,775 | B2 | * | 4/2012 | Kim | F01M 13/022 |
| | | | | | 123/41.86 |
| 2002/0056423 | A1 | | 5/2002 | Yamaki et al. | |
| 2006/0027777 | A1 | * | 2/2006 | Koeneman | F16K 11/074 |
| | | | | | 251/205 |
| 2009/0312661 | A1 | * | 12/2009 | Kullik | A61B 5/0876 |
| | | | | | 600/538 |
| 2011/0083625 | A1 | * | 4/2011 | Lyons | F01M 13/021 |
| | | | | | 123/41.86 |
| 2012/0056115 | A1 | * | 3/2012 | Briley | F16K 31/1262 |
| | | | | | 251/65 |

FOREIGN PATENT DOCUMENTS

| DE | 19860154 A1 | 6/2000 |
| DE | 10156039 A1 | 9/2002 |

* cited by examiner

*Primary Examiner* — Marguerite McMahon
(74) *Attorney, Agent, or Firm* — James Hasselbeck

(57) ABSTRACT

A crankcase ventilation device features a closing valve with a valve body, the valve body executes a positioning movement between a closed and an opened position. A sensor device for detecting the positioning movement of the valve body is disposed in the housing.

11 Claims, 4 Drawing Sheets

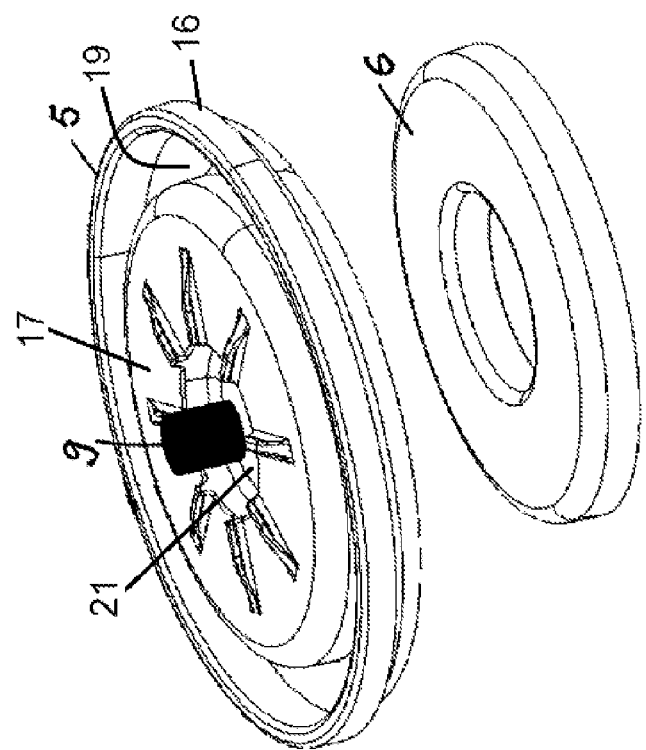
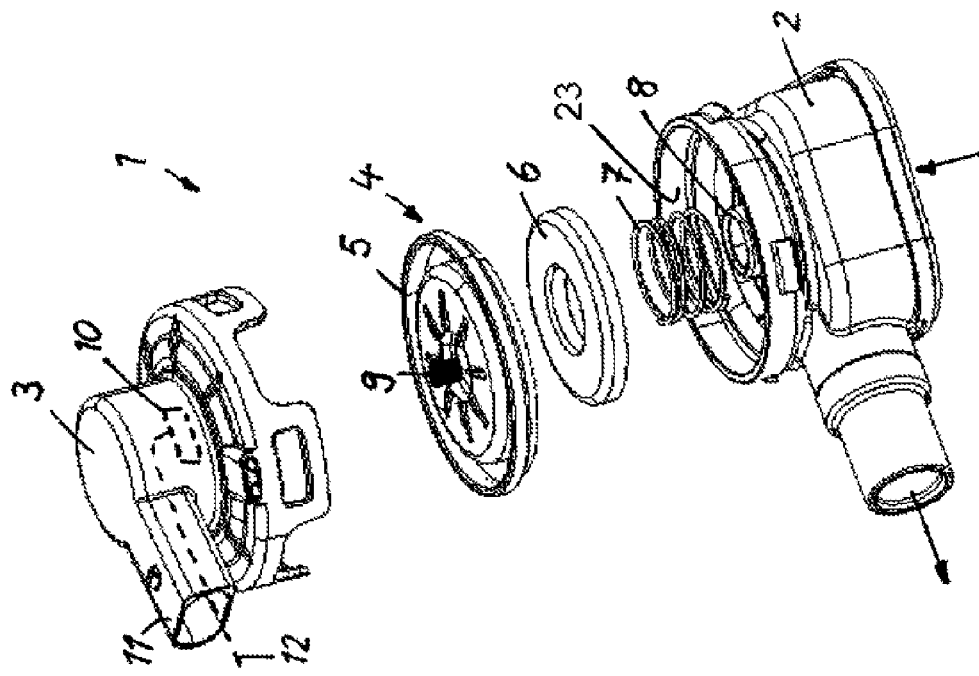

CRANKCASE VENTILATION DEVICE

CROSS REFERENCE TO RELATED APPLICATIONS

This application is a continuation-in-part of application Ser. No. 13/607,694, filed Sep. 8, 2012, which claims the benefit under 35 USC 119 of foreign application DE 102011112584.5 filed in Germany on Sep. 8, 2011, and which is hereby incorporated by reference in its entirety.

TECHNICAL FIELD

The invention relates to a crankcase ventilation device for an internal combustion engine.

BACKGROUND OF THE INVENTION

DE 198 60 154 A1 describes a crankcase ventilation device via which the cleaned blow-by gases are returned from the crankcase of an internal combustion engine into the intake tract. The crankcase ventilation device features in a housing through which leads a flow path for the blow-by gases, a pressure regulating valve which, depending on the differential pressure, switches upstream and downstream of the valve between an opening and closing position. The pressure regulating valve of which is designed mechanically and features as valve body a membrane which is pretensioned into the opening position by a spring element.

JP 2010-196594 A describes a crankcase ventilation device which features an electro-magnetic closing valve that is switched depending on the pressure by supplying current to a coil. The pressure is determined by means of a pressure sensor.

SUMMARY OF THE INVENTION

An object of the invention is to be able to diagnose malfunctions of a crankcase ventilation device with simple measures.

The crankcase ventilation device can be used in internal combustion engines to separate oil drops from the blow-by gases from the crankcase of the internal combustion engine and to guide them into the intake tract of the internal combustion engine. The crankcase ventilation device features a housing in which is formed a flow path for the blow-by gases, a closing valve being disposed in the flow path to open and close, respectively, the flow path depending on the pressure. The closing valve features a valve body which executes a positioning movement for opening and closing the valve. The closing valve is advantageously designed as a pressure regulating valve which is designed mechanically and passive, that means it functions without energy supply. The pressure regulating valve comprises a valve body, for example a membrane and is switched, depending on the differential pressure, upstream and downstream of the valve.

To detect problems of the functional efficiency of the closing valve, a sensor device via which the positioning movement of the valve body of the closing valve can be detected is disposed in the housing of the crankcase ventilation device. In this way it is possible to compare the actually executed actual movement of the valve body with a set course, inadmissibly high variances between the actual and the set course indicating a functional disorder of the closing valve. The actual course can be documented, where appropriate an error signal is generated in the case of an inadmissibly high variance of the actual valve movement course from the set valve movement course.

The sensor device allows to detect functional disorders of the closing valve which are, for example, generated at low temperatures by freezing and sticking of the valve body so that the valve body becomes stuck or immovably fixed either in the closed position, in the partially closed or in the completely opened position and that a positioning movement is excluded. Such disorders can be detected by the sensor devices and documented as part of an on-board diagnosis.

According to a preferred embodiment, the closing valve is designed as a mechanically acting, passive valve. Only the positioning movement of the valve body is detected by the sensor device, and because of the passive design of the closing valve the valve movement is not influenced.

In an alternative embodiment, the switching valve is designed as actuator, for example as an electromagnetic switching valve that switches in case of energy supply between a closed and an open position. In this case, the detection of the adjustment travel in a closed loop can be used for setting the movement of the valve body.

According to a further advantageous embodiment, the sensor device is designed as a magnetic sensor and comprises, on the one hand, a magnetic element and, on the other hand, a sensor element for detecting the magnetic field lines of the magnetic element. A Hall sensor, in particular, comes into consideration as the sensor element. The sensor components—the magnetic element and the sensor element—are disposed at the housing and at the valve body and at a component connected with the valve body, respectively, and they can carry out a relative movement with respect to each other, preferably an axial movement which leads to a modification of the magnetic flux density of the magnetic element, that is something which can be detected by the sensor element.

According to a preferred embodiment, the magnetic or Hall sensor is disposed at the housing and the magnetic element at the valve body and at a component connected with the valve body, respectively. In the case that the valve body is designed as membrane, it can be the support for a sensor component, in particular for the magnetic element. However, an arrangement of the magnetic element at a supporting ring allocated to the membrane that executes the same positioning movement as the membrane can be taken into consideration. In this case, the magnetic element is, for example, located eccentrically at the supporting ring in relation to the supporting ring axis, which at the same time marks the adjustment movement of the membrane. According to still another embodiment it is, on the other hand, intended that the magnet is designed as magnetic ring and disposed at the supporting ring, and possibly at the membrane. In still another embodiment variant, the supporting ring or another component connected with the valve body consists at least partially of material containing magnets, for example magnetic particles in a synthetic material.

Basically, an embodiment is also taken into consideration where the sensor element is disposed at the valve body and at a component connected with the valve body, respectively, and attached to the housing.

The sensor component on the housing side is, for example, located in a housing cover for closing a housing opening into which the closing valve is introduced. However, an arrangement on a valve dome on the housing side which receives the closing valve is also possible.

According to still another advantageous embodiment, a coil supplied with current and which, if a voltage is applied, exerts a force on the magnetic element and on the components with which the magnetic element is connected, is allocated to the magnetic element. According to the polarity of the voltage it is possible to apply an attractive or repulsive force to the magnetic element so that the valve body is adjusted by force either in the direction of the opening or the closing position. The coil supplied with current and the magnetic element form a solenoid DC so that the sensor device to which the magnetic element belongs can easily be extended to an actuator for adjusting the valve body. By supplying the coil with current and adjusting by force the valve body into the closing or opening position it is possible to influence directly the switching status of the closing valve. As a result, an unstable state, for example, accompanied by flutter behavior of the closing valve which is frequently switched on and off can be bridged until a stable state is reached. Even in the case of a frozen valve body it is possible to use the coil supplied with current advantageously by generating heat by means of the current so that the valve body is unfrozen.

At the housing of the crankcase ventilation device a connecting orifice for electrical connections to the sensor element of the sensor device is expediently provided. The connecting orifice is, for example, located in the housing cover, but an arrangement in the basic housing can also be considered. The electrical connections lead to a closed-loop control and an open-loop control, respectively, to which the signals of the sensor element are supplied. The signal behavior can be stored in the open-loop control and evaluated, if required. For example, an error signal can be generated in the closed-loop control and in the open-loop control if the actual signals vary inadmissibly from the desired values.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIG. 2 depicts the crankcase ventilation device in an exploded view;

FIG. 3 depicts a membrane in enlarged view which represents the valve body of a pressure regulating valve, with a cylindrical magnetic element disposed on the membrane and a supporting ring allocated to the membrane;

Figure 1:
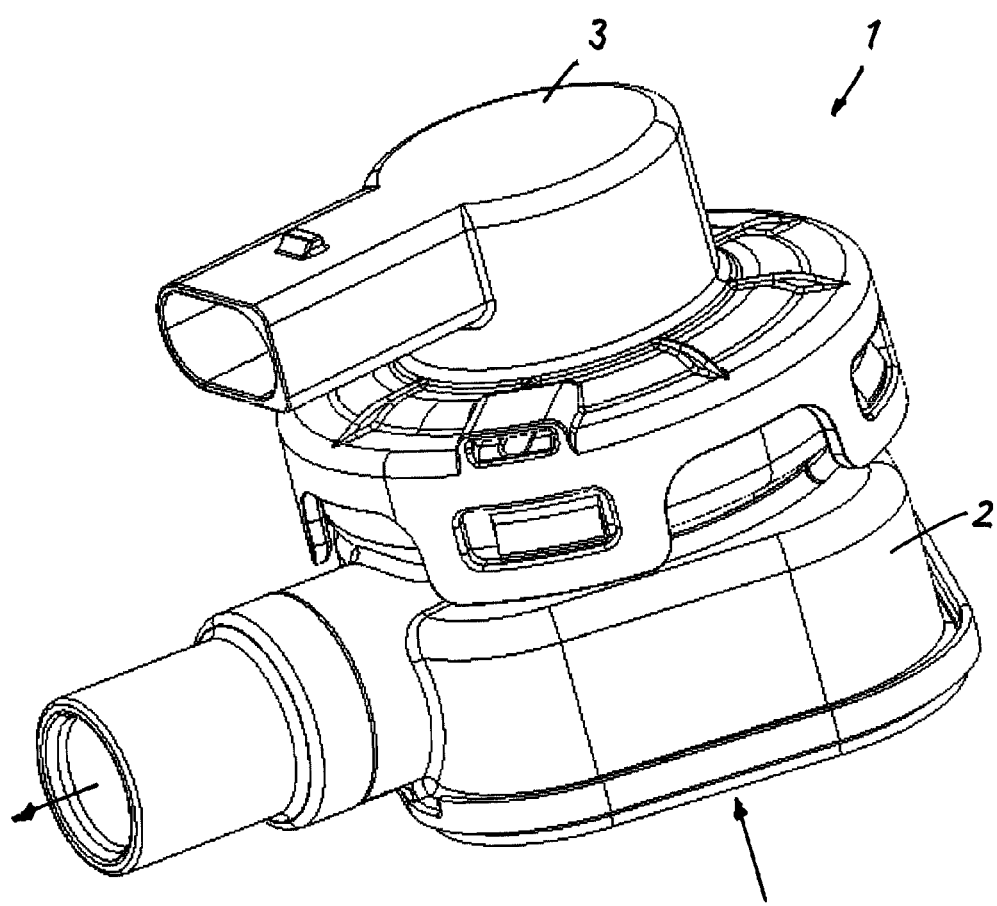
FIG. 1 is a perspective drawing of a crankcase ventilation device for an internal combustion engine.

Identical components in the figures have the same reference numerals Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to crankcase ventilation device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a crankcase ventilation device 1 with a housing 2 and an attachable cover 3 via which the cleaned blow-by gases of a crankcase of an internal combustion engine are directed into the intake tract of the internal combustion engine. Arrows indicate the flow path of the blow-by gases through the housing 2 of the crankcase ventilation device 1; the blow-by gases are directed into the housing 2 from below after having flowed through an oil separator and bled off in lateral and radial direction, respectively.

As it can be understood from FIG. 2, a pressure regulating valve 4 which is located in the flow path of the blow-by gases and closes and opens the flow path, respectively, is integrated in the housing 2 of the crankcase ventilation device 1. The pressure regulating valve 4 features a membrane 5 as valve body with which a supporting ring 6 for stabilizing the membrane 5 is connected. The membrane 5 and the supporting ring 6 jointly carry out a positioning movement in relation to the housing 2 and the housing cover 3 during opening and closing. In closing position, the membrane 5 is placed on a valve dome 8 which is formed in the housing 2 and is part of the flow path for the blow-by gases. When the membrane 5 is placed on the valve dome 8, the flow path is closed, when the membrane 5 is lifted off, the flow path is open. The supporting ring 6 is forced into the opening position through the force of a spring element 7 which is laid around the valve dome 8 and designed as compression spring.

As it can seen from FIG. 2 in connection with FIG. 3, the membrane 5 supports a centrically disposed cylindrical magnetic element 9 which is located on the membrane's 5 upper side that faces away from the valve dome 8. Allocated to the magnetic element 9 is a Hall sensor 10 in the housing cover 3 that forms a sensor element via which modifications in the flux density of the magnetic element can be detected during a relative movement between magnetic element and Hall sensor 10. In this way, the positioning movement of the membrane 5 which represents the valve body of the pressure regulating valve can be detected by the Hall sensor 10. As shown in FIG. 3, the membrane 5 may have a central membrane portion 17. The membrane 5 may include a central valve body portion 21 offset inwardly from the central membrane portion 17 of the membrane 5 towards the valve dome 8. The lower side of the central valve body portion 21 of the membrane 5 contacts directly onto and closes upon the valve dome 8 to close the flow path of the crankcase ventilation device 1. The central valve body portion 21 is radially outwardly circumferentially surrounded by the central membrane portion 17. The central membrane portion 17 is circumferentially surrounded by an annular groove portion 19 of the membrane 5. A radial outer circumferential portion 16 of the membrane 5 is spaced radially outwardly from the annular groove portion 19 and contacts the interior 23 of the housing 2. The supporting ring 6 supportively contacts against a lower side of the central membrane portion 17 and may be arranged radially between the annular groove portion 19 and the central valve body portion 21 of the membrane 5.

A radially directed connecting branch 11 through which are led one or several electrical connecting cables 12 via which the Hall sensor 10 can be connected with a closed-control loop and an open-control loop, respectively, in which the sensor data are stored and evaluated, is integrally molded to the housing cover 3.

Figure 4:
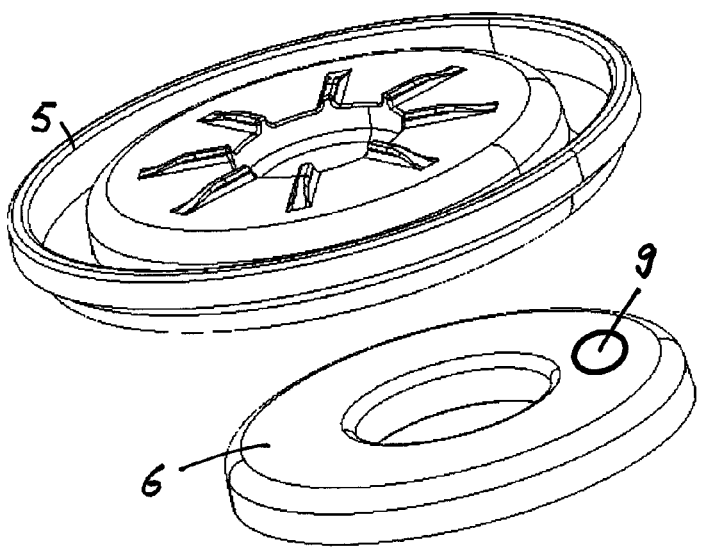
FIG. 4 depicts one variant of an embodiment of the membrane and the supporting ring which supports an eccentrically disposed magnetic element.

FIG. 4 shows another example of an embodiment where the magnetic element 9 is disposed at the supporting ring 6, in particular at the bottom side of the supporting ring that faces away from the membrane 5. The magnetic element 9 is positioned eccentrically in relation to the central axis of the supporting ring and the membrane. Advantageously, the Hall sensor is also disposed eccentrically on the same side as the magnetic element.

Where appropriate, the magnetic element 9 can also be disposed directly on the membrane 5, however, eccentrically in relation to the central axis.

Figure 5:
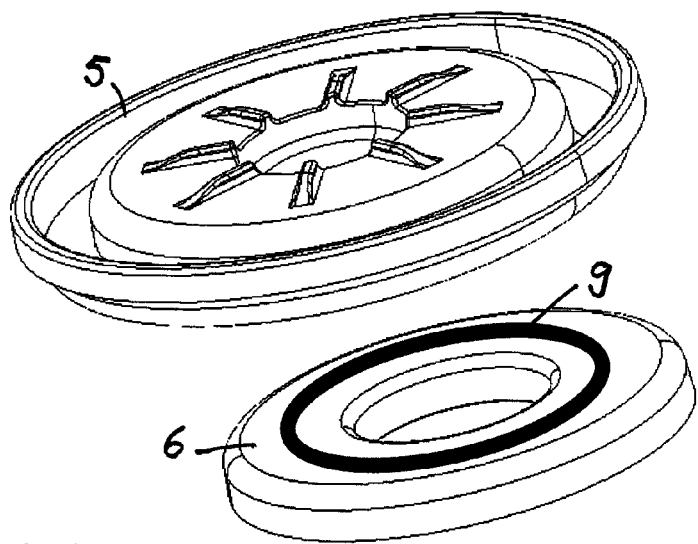
FIG. 5 depicts another example of an embodiment of an annular magnetic element at the supporting ring.

In the example of an embodiment according to FIG. 5, the magnetic element 9 is designed as magnetic ring which is located on the supporting ring 6. Where appropriate, an arrangement directly on the membrane 5 can be taken into account in this case, too.

In both examples of an embodiment according to FIGS. 4 and 5 it can also be appropriate to integrate the magnetic element 9 either partially or totally into the material of the supporting ring 6 which consists preferably of synthetic material. Furthermore, it is possible to manufacture the membrane and/or the supporting ring from a material that is at least section-wise magnetic, for example by adding magnetic particles to the basic material of the membrane or the supporting ring. The basic material of the membrane and the supporting ring, respectively, is expediently made of synthetic material.

Figure 6:
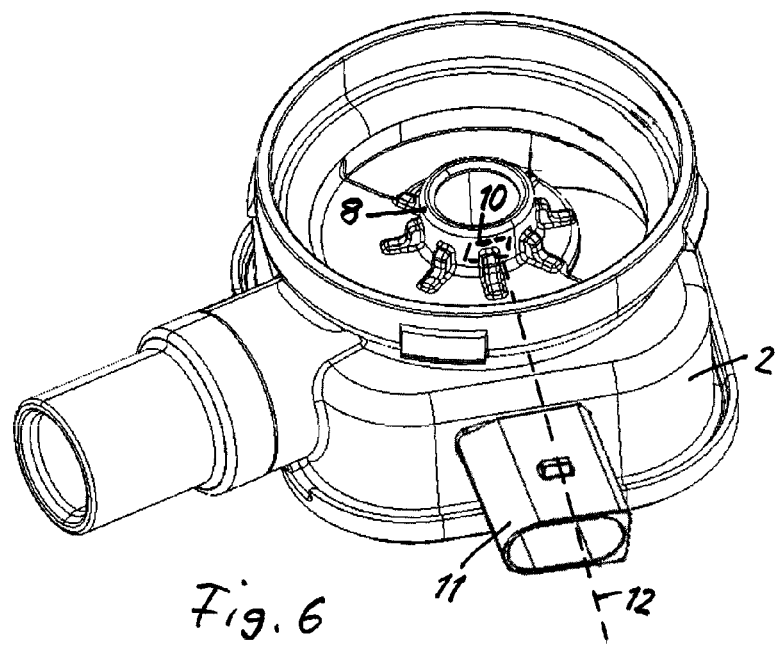
FIG. 6 depicts a perspective view of the opened crankcase ventilation device.

In the example of an embodiment according to FIG. 6, the sensor element 10 which is preferably a Hall sensor is integrated in the valve dome 8 in the housing 2. The connecting cables 12 run through the connecting branch 11 which, in this example of an embodiment, is integrally molded to the housing 2. As the membrane and the supporting ring carry out a positioning movement in relation to the valve dome 8 and, therefore, also in relation to the Hall sensor 10, this positioning movement can be detected, provided a magnetic element is disposed at the membrane or the supporting ring.

Figure 7:
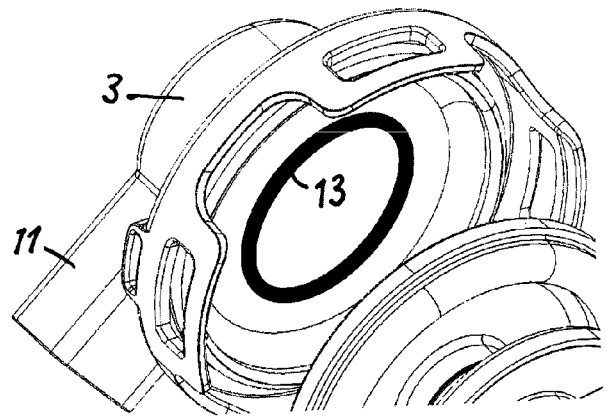
FIG. 7 depicts a view of the interior side of the cover of the housing with a coil integrated therein that is supplied with electrical current.

In the example of an embodiment according to FIG. 7, integrated in the cover 3 is a coil 13 supplied with current which forms together with the magnetic element which is disposed at the valve body, an electromagnetic actuator via which the valve body is adjusted by force into an opening and closing position, respectively, depending on the polarity of the voltage applied to the coil 13. The electrical wires for supplying current to the coil 13 are expediently also led through the connecting branch 11 that is integrally molded to the housing cover 3. The coil 13 is, in particular, provided in addition to the sensor element which is expediently also integrated in the cover 3 in order to detect the positioning movement of the valve body.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A crankcase ventilation device for an internal combustion engine, comprising:
   a housing;
   a closing valve arranged in the housing and in a flow path of an air flow coming from a crankcase,
   wherein the closing valve includes a valve body executing a positioning movement between a closed and an opened position relative to a valve dome in the housing;
   wherein the valve body is a membrane having
      a radial outer circumferential portion contacting an interior of the housing;
      a central membrane portion spaced radially inwardly from the radial outer circumferential portion;
      an annular groove portion of the membrane arranged between the radial outer circumferential portion and the central membrane portion;
   wherein the membrane is operable to move from an open position in which the membrane is spaced apart from the valve dome opening the flow path; to a closed position in which the membrane is arranged on and closing onto the valve dome, closing the flow path;
   an annular support ring arranged at and contacting a lower side of the central membrane portion, stabilizing the membrane;
   a sensor device disposed in the housing of the crankcase ventilation device, the sensor device operable to detect positioning movement of the valve body between the open and closed positions;

wherein the sensor device comprises
a Hall sensor arranged on the housing;
a cylindrical magnetic element arranged on and secured onto the central membrane portion of the membrane at a side opposite the valve dome.

2. The crankcase ventilation device according to claim 1, wherein
an electric coil is arranged on an interior side of the housing, the electric coil, when supplied with an electric current, exerts a force on the cylindrical magnetic element and to the membrane such that the valve body is adjusted by the force into an opening and closing position, respectively, depending on polarity of voltage applied to the electric coil.

3. The crankcase ventilation device according to claim 1, wherein
the Hall sensor is disposed in a housing cover that covers over and overlaps the closing valve.

4. The crankcase ventilation device according to claim 1, wherein
the Hall sensor is integrated in a valve dome in the housing which receives the closing valve.

5. The crankcase ventilation device according to claim 1, wherein
the closing valve is a pressure regulating valve.

6. The crankcase ventilation device according to claim 1, wherein
the housing includes a housing cover;
wherein a connecting orifice for electrical connections for the Hall sensor of the sensor device is disposed at the housing cover.

7. The crankcase ventilation device according to claim 1, wherein
the central membrane portion in its center includes a central valve body portion, the central valve body portion offset inwardly towards the valve dome relative to the surrounding central membrane portion of the membrane, the central valve body portion circumferentially surrounded by a remaining portion of the central membrane portion;
wherein a lower side of the central valve body portion of the membrane contacts directly onto and closes upon the valve dome to close the flow path;
wherein the annular support ring is arranged radially between the annular groove portion and the central valve body portion of the membrane.

8. A crankcase ventilation device for an internal combustion engine, comprising:
a housing;
a closing valve arranged in the housing and in a flow path of an air flow coming from a crankcase,
wherein the closing valve includes a valve body executing a positioning movement between a closed and an opened position relative to a valve dome in the housing;
wherein the valve body is a membrane having
a radial outer circumferential portion contacting an interior of the housing;
a central membrane portion spaced radially inwardly from the radial outer circumferential portion; and
an annular groove portion of the membrane arranged between the radial outer circumferential portion and the central membrane portion;
wherein the membrane is operable to move from an open position in which the membrane is spaced apart from the valve dome opening the flow path; to a closed position in which the membrane is arranged on and closing onto the valve dome, closing the flow path;
an annular supporting ring having:
a magnetic ring embedded into material of the supporting ring,
the annular support ring arranged at and contacting a lower side of the central membrane portion, stabilizing the membrane;
a Hall sensor disposed on an interior of the housing;
wherein the Hall sensor interacts with the magnetic ring of annular support ring to detect positioning movement of the valve body between the open and closed positions.

9. The crankcase ventilation device according to claim 8, further comprising:
an electric coil arranged on an interior side of the housing, the electric coil, when supplied with an electric current, exerts a force on the magnetic ring of the support ring and thereby to the membrane connected to the support ring such that the valve body is adjusted by the force into an opening and closing position, respectively, depending on polarity of voltage applied to the electric coil.

10. The crankcase ventilation device according to claim 8, wherein
the closing valve is a pressure regulating valve.

11. The crankcase ventilation device according to claim 8, wherein
the central membrane portion in its center includes a central valve body portion, the central valve body portion offset inwardly towards the valve dome relative to the surrounding central membrane portion of the membrane, the central valve body portion circumferentially surrounded by a remaining portion of the central membrane portion;
wherein a lower side of the central valve body portion of the membrane contacts directly onto and closes upon the valve dome to close the flow path;
wherein the annular support ring is arranged radially between the annular groove portion and the central valve body portion of the membrane.

* * * * *